US010579663B2

(12) United States Patent
Spisic et al.

(10) Patent No.: US 10,579,663 B2
(45) Date of Patent: Mar. 3, 2020

(54) DATA INSIGHT DISCOVERY USING A CLUSTERING TECHNIQUE

(71) Applicant: INTERNATIONAL BUSINESS MACHINES CORPORATION, Armonk, NY (US)

(72) Inventors: Damir Spisic, Chicago, IL (US); Jing Xu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/584,400

(22) Filed: May 2, 2017

(65) Prior Publication Data

US 2018/0322130 A1 Nov. 8, 2018

(51) Int. Cl.
| G06F 16/00 | (2019.01) |
| G06F 16/35 | (2019.01) |
| G06K 9/62 | (2006.01) |
| G06F 16/28 | (2019.01) |
| G06F 16/31 | (2019.01) |
| G06F 16/22 | (2019.01) |

(52) U.S. Cl.
CPC ........ G06F 16/355 (2019.01); G06F 16/2246 (2019.01); G06F 16/287 (2019.01); G06F 16/313 (2019.01); G06F 16/358 (2019.01); G06K 9/6221 (2013.01); G06K 9/6231 (2013.01); *G06F 16/00* (2019.01); *G06F 16/322* (2019.01)

(58) Field of Classification Search
CPC .... G06F 16/355; G06F 16/358; G06F 16/287; G06F 16/322; G06F 16/2246; G06F 16/313; G06F 16/00; G06F 17/30327; G06F 17/18; G06F 17/3071; G06F 17/30616; G06F 17/30601; G06F 17/30625; G06F 17/30713; G06F 17/30; G06K 9/6219; G06K 9/6221; G06K 9/6231; G06K 9/6226; G06K 9/6218; H04L 12/1813
See application file for complete search history.

(56) References Cited

U.S. PATENT DOCUMENTS 6,374,251 B1 * 4/2002 Fayyad .................. G06F 16/35
707/E17.058
6,449,612 B1 * 9/2002 Bradley ............... G06K 9/6221
707/E17.058
(Continued)

OTHER PUBLICATIONS

Mell et al., "The NIST Definition of Cloud Computing," National Institute of Standards and Technology, Sep. 2011, p. 1-3, Special Publication 800-145.
(Continued)

*Primary Examiner* — Anh Ly
(74) *Attorney, Agent, or Firm* — Michael O'Keefe

(57) ABSTRACT

Disclosed aspects relate to data insight discovery using a clustering technique. A set of data may be compressed based on a set of proximity values with respect to a set of predictors to assemble a set of sub-clusters. A set of subgroups may be established by merging a plurality of individual sub-clusters of the set of sub-clusters using a tightness factor. A subset of the subgroups may be selected based on a selection criterion. A set of insight data which indicates a profile of the subset of the set of subgroups with respect to the set of data may be compiled for the subset of the set of subgroups.

20 Claims, 12 Drawing Sheets

(56) References Cited

U.S. PATENT DOCUMENTS

| | | | |
|---|---|---|---|
| 6,581,058 B1* | 6/2003 | Fayyad | G06F 16/30 |
| | | | 707/737 |
| 7,080,057 B2* | 7/2006 | Scarborough | G06Q 10/063 |
| | | | 706/60 |
| 9,336,302 B1 | 5/2016 | Swamy | |
| 9,418,148 B2 | 8/2016 | Joshi et al. | |
| 9,460,236 B2 | 10/2016 | Shyr et al. | |
| 2005/0234697 A1* | 10/2005 | Pinto | G06Q 10/06 |
| | | | 703/22 |
| 2005/0234753 A1* | 10/2005 | Pinto | G06Q 10/04 |
| | | | 700/44 |
| 2006/0039593 A1* | 2/2006 | Sammak | G06K 9/00127 |
| | | | 382/133 |
| 2008/0082531 A1* | 4/2008 | Suarez | G06F 16/355 |
| | | | 707/E17.091 |
| 2009/0299857 A1* | 12/2009 | Brubaker | G06Q 30/02 |
| | | | 705/14.66 |
| 2010/0153332 A1* | 6/2010 | Rollins | G06Q 10/10 |
| | | | 707/603 |
| 2011/0119212 A1* | 5/2011 | De Bruin | A61B 5/00 |
| | | | 706/12 |
| 2011/0271177 A1* | 11/2011 | Bastos dos Santos | |
| | | | G06F 17/243 |
| | | | 715/256 |
| 2012/0185930 A1* | 7/2012 | Desai | G06F 21/6218 |
| | | | 726/13 |
| 2013/0238649 A1 | 9/2013 | Shum | |
| 2015/0039624 A1 | 2/2015 | Chu et al. | |
| 2015/0286704 A1* | 10/2015 | Shyr | G06F 16/35 |
| | | | 707/737 |
| 2015/0286707 A1* | 10/2015 | Levitan | G06F 16/285 |
| | | | 707/737 |
| 2016/0070854 A1* | 3/2016 | Wong | G06F 19/22 |
| | | | 702/19 |
| 2016/0110442 A1 | 4/2016 | Williams et al. | |
| 2016/0266779 A1 | 9/2016 | Sheldon et al. | |

OTHER PUBLICATIONS

Herrera et al., "An overview on subgroup discovery: foundations and applications", Knowledge and Information Systems, 2011, vol. 29, Issue 3, Regular Paper, Published Online: Nov. 11, 2010, © Springer-Verlag London Limited 2010, pp. 495-525.

Umek et al., "Subgroup Discovery in Data Sets with Multi-Dimensional Responses", Intelligent Data Analysis, Research Article, vol. 15, No. 4, Jan. 2011, pp. 533-549.

Zimmermann et al., "Cluster-grouping: from subgroup discovery to clustering", Mach Learn, 2009, vol. 77, pp. 125-159, Published Online: Jun. 16, 2009, Springer Science+Business Media, LLC 2009.

Atzmueller et al., "Fast and Effective Subgroup Mining for Continuous Target Variables", KDML 2009 Knowledge Discovery, Data Mining and Machine Learning, Sep. 2009, pp. 1-8.

Friedman et al., "Clustering objects on subsets of attributes", Journal Royal Statistical Society: Series B (Statistical Methodology), vol. 66, Part 4, pp. 815-849, © 2004 Royal Statistical Society, First published: Oct. 13, 2004.

Parsons et al., "Subspace Clustering for High Dimensional Data: A Review", ACM Sigkdd Explorations Newsletter, Jun. 2004, vol. 6, Issue 1, pp. 90-105.

Hair et al., "Multivariate Data Analysis", http://www.mvstats.com/Page3_Downloads_datasets_htm, printed Apr. 17, 2017, pp. 1-3.

* cited by examiner

DATA INSIGHT DISCOVERY USING A CLUSTERING TECHNIQUE

BACKGROUND

This disclosure relates generally to computer systems and, more particularly, relates to data insight discovering using a clustering technique. Application programs may be used to carry out a variety of functions. The amount of data in application programs is increasing. As the amount of data in application programs increases, the need for data insight discovery using a clustering technique may also increase.

SUMMARY

Aspects of the disclosure relate to data insight discovery using a clustering technique. Data subgroups may be merged to form clusters that provide insights into the relationships between predictors and multiple targets. A set of data may be compressed into sub-clusters according to computed distances among points in a predictor space. Hierarchical clustering techniques may be used to generate subgroups of the compressed data. Tightness values may be computed for one or more sub-clusters based on the distance between data points or the sub-clusters in a target space, and sub-clusters may be merged to form the sub-groups based on the computed tightness values. One or more of the sub-groups may be selected. A set of insight data indicating a relationship between inputs and outputs of the set of data may be generated based on the selected sub-groups.

Disclosed aspects relate to data insight discovery using a clustering technique. A set of data may be compressed based on a set of proximity values with respect to a set of predictors to assemble a set of sub-clusters. A set of sub-groups may be established by merging a plurality of individual sub-clusters of the set of sub-clusters using a tightness factor. A subset of the subgroups may be selected based on a selection criterion. A set of insight data which indicates a profile of the subset of the set of subgroups with respect to the set of data may be compiled for the subset of the set of subgroups.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
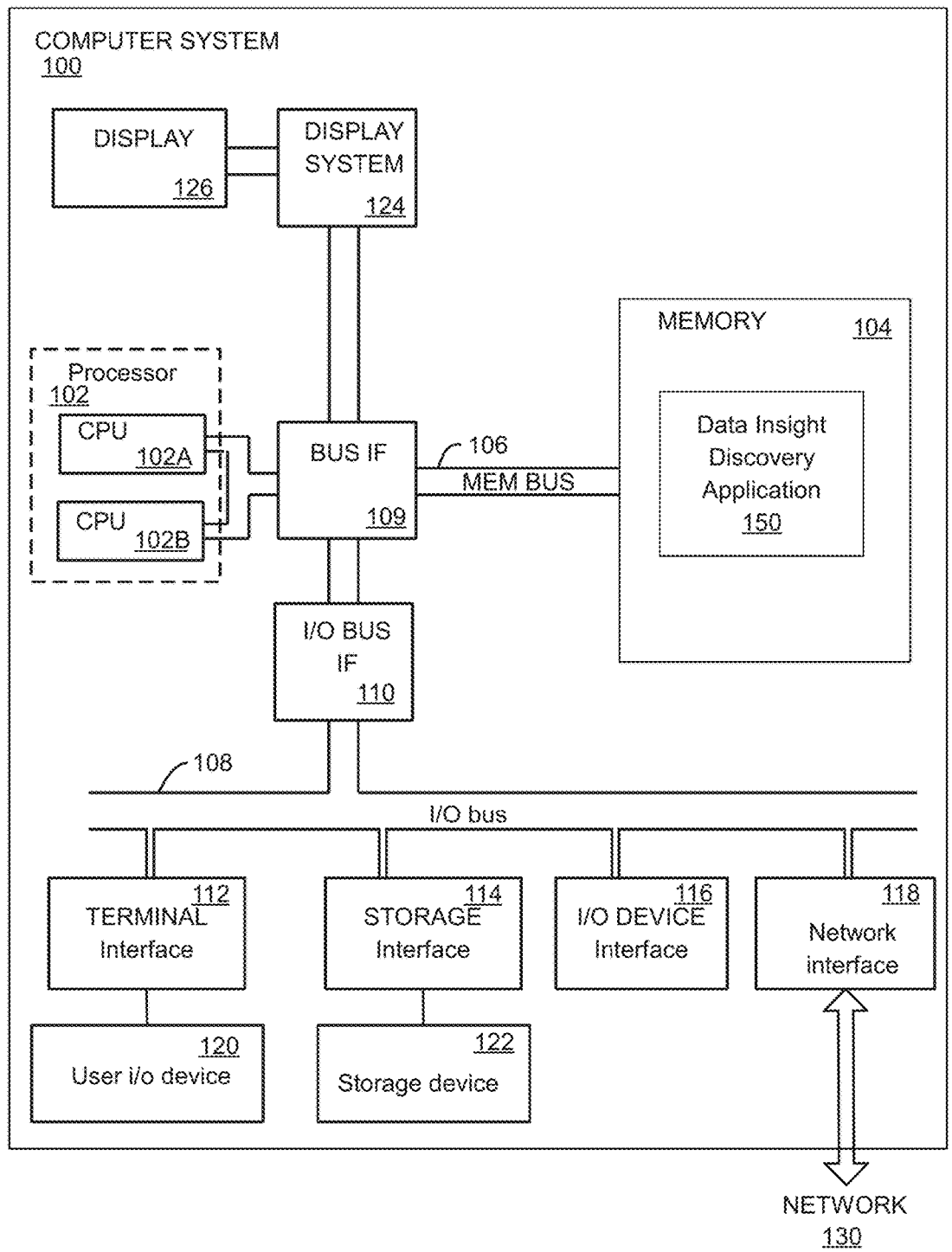
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to data insight discovery using a clustering technique. Data subgroups may be merged to form clusters that provide insights into the relationships between predictors and multiple targets. A set of data may be compressed (e.g., using cluster feature trees) into sub-clusters according to computed distances among points in a predictor space. Hierarchical clustering techniques may be used to generate subgroups of the compressed data. Tightness values may be computed for one or more sub-clusters based on the distance between data points or the sub-clusters in a target space, and sub-clusters may be merged to form the sub-groups based on the computed tightness values. One or more of the sub-groups (e.g., sub-groups that achieve a threshold size, tightness, or isolation) may be selected. A set of insight data indicating a relationship between inputs and outputs of the set of data may be generated based on the selected sub-groups. Leveraging tightness-based sub-cluster merging with respect to data clustering techniques may be associated with benefits, such as statistical inference accuracy, insight extraction, and data relevance.

In statistical analysis, data clustering is one technique that may be used to group similar data objects to facilitate exploratory data mining and insight discovery. Aspects of the disclosure relate to the recognition that, in some situations, clustering techniques and predictive analysis are often applied separately for implementing data segmentation or finding models that predict target values in terms of the inputs. However, in some instances, making use of clustering techniques with respect to input variables may lead to predictive models (e.g., when each cluster in the input space corresponds predominantly to a single class for a categorical target or a narrow range of values for a continuous target). For instance, data may include several variables that describe an outcome of interest, such that it may be desirable to detect subsets of data with strong relationships between input and output variables. Accordingly, aspects of the disclosure relate to using data clustering techniques to merge sub-clusters of data into sub-groups based on their level of tightness in a target space. One or more sub-groups may be selected based on the tightness, isolation, or size of the sub-group, and used to compile a set of insight data that indicates a relationship between inputs and outputs of the set of data. The set of insight data may be used to facilitate understanding of phenomena related to the collected data as well as the behavior that the data indicates.

Aspects of the disclosure relate to a system, method, and computer program product for data insight discovery using a clustering technique. A set of data may be compressed based on a set of proximity values with respect to a set of predictors to assemble a set of sub-clusters. A set of sub-groups may be established by merging a plurality of individual sub-clusters of the set of sub-clusters using a tightness factor. A subset of the subgroups may be selected based on a selection criterion. A set of insight data which indicates a profile of the subset of the set of subgroups with respect to the set of data may be compiled for the subset of the set of subgroups.

In embodiments, the set of subgroups may be established by merging the plurality of individual sub-clusters of the set of sub-clusters using a homogeneity factor with respect to the set of predictors. In embodiments, the plurality of individual sub-clusters of the set of sub-clusters may be evaluated based on an attribute comparison with one or more other individual sub-clusters of the set of sub-clusters. In embodiments, a first tightness factor for a first individual sub-cluster may be compared with a tightness threshold, a second tightness factor for a second individual sub-cluster may be compared with the tightness threshold, achievement of the tightness threshold may be ascertained by both the first and second tightness factors for the first and second individual sub-clusters, and the plurality of individual sub-clusters of the set of sub-clusters may be merged. In embodiments, the selection criterion may be configured to include one or more of a subgroup size factor, a subgroup tightness factor, or a subgroup isolation index. Altogether, aspects of the disclosure can have performance or efficiency benefits. Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a data insight discovery application 150. In embodiments, the data insight discovery application 150 may include instructions or statements that execute on the processor 102 or instructions or statements that are interpreted by instructions or statements that execute on the processor 102 to carry out the functions as further described below. In certain embodiments, the data insight discovery application 150 is implemented in hardware via semiconductor devices, chips, logical gates, circuits, circuit cards, and/or other physical hardware devices in lieu of, or in addition to, a processor-based system. In embodiments, the data insight discovery application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
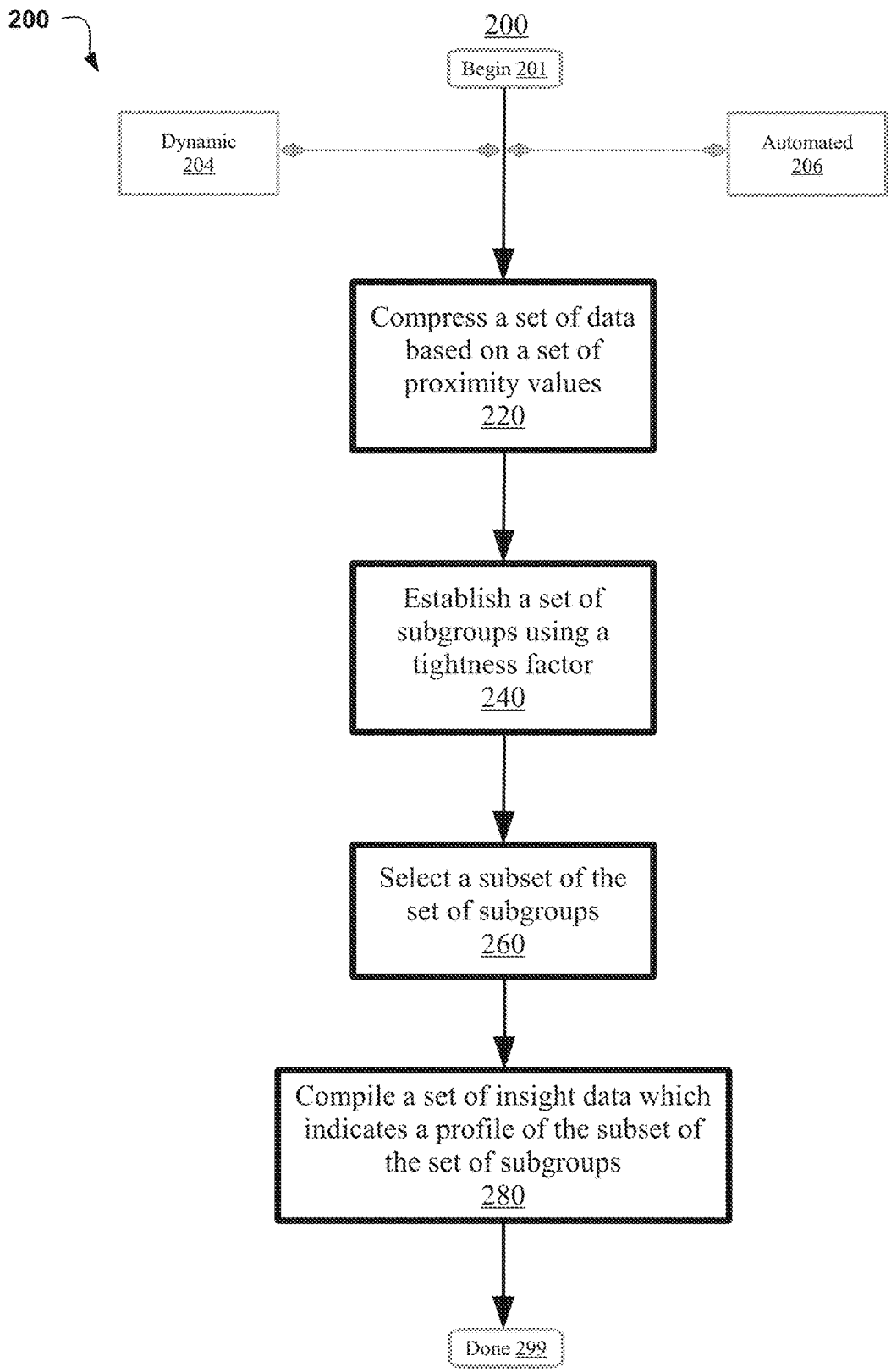
FIG. 2 is a flowchart illustrating a method for data insight discovery using a clustering technique, according to embodiments.

FIG. 2 is a flowchart illustrating a method 200 for data insight discovery using a clustering technique, according to embodiments. Aspects of the disclosure relate to establishing a set of subgroups of a set of sub-clusters using a tightness factor, and compiling a set of insight data which indicates a profile of the subset of the set of subgroups. A set of data may be compressed to obtain a set of sub-clusters. A hierarchical clustering method may be applied to the set of sub-clusters to merge one or more sub-clusters into a set of sub-groups based on a tightness factor for the set of sub-clusters in a target space. The hierarchical clustering method may include a statistical analysis technique configured to build a hierarchy of clusters. The hierarchical clustering method may include an agglomerative method (e.g., observations are made in individual clusters, and pairs of clusters are merged moving up the hierarchy) and a divisive method (e.g., observations are made in one cluster, and splits are performed recursively moving down the hierarchy). A subset of the set of sub-groups created using the hierarchical clustering method may be selected based on a selection criterion, and a set of insight data may be compiled for the subset of the set of sub-groups. Leveraging tightness-based sub-cluster merging with respect to data clustering techniques may be associated with benefits such as statistical inference accuracy, insight extraction, and data relevance. The method 200 may begin at block 201.

In embodiments, the compressing, the establishing, the selecting, the compiling, and the other steps described herein may each be executed in a dynamic fashion at block 204. The steps described herein may be executed in a dynamic fashion to streamline data insight discovery using the clustering technique. For instance, the compressing, the establishing, the selecting, the compiling, and the other steps described herein may occur in real-time, ongoing, or on-the-fly. As an example, one or more steps described herein may be performed on-the-fly (e.g., sets of subgroups may be dynamically established in real time as tightness factors in a target space are calculated for collected data) in order to streamline (e.g., facilitate, promote, enhance) data insight discovery using the clustering technique. Other methods of performing the steps described herein are also possible.

In embodiments, the compressing, the establishing, the selecting, the compiling, and the other steps described herein may each be executed in an automated fashion at block 206. The steps described herein may be executed in an automated fashion without user intervention. In embodiments, the compressing, the establishing, the selecting, the compiling, and the other steps described herein may be carried-out by an internal data insight discovery module maintained in a persistent storage device of a local computing device (e.g., network node). In embodiments, the compressing, the establishing, the selecting, the compiling, and the other steps described herein may be carried-out by an external data insight discovery module hosted by a remote computing device or server (e.g., server accessible via a subscription, usage-based, or other service model). In this way, aspects of data insight discovery using a clustering technique may be performed using automated computing machinery without manual action. Other methods of performing the steps described herein are also possible.

At block 220, a set of data is compressed. The compressing may be performed based on a set of proximity values with respect to a set of predictors. The compressing may be performed to assemble a set of sub-clusters. Generally, compressing can include binding, compacting, wrapping, shrinking, reducing, condensing, or otherwise consolidating the set of data. The set of data may include a collection of qualitative or quantitative information related to a topic or subject. The set of data may include a group of points or variables that indicate facts, values, words, measurements, or observations. As examples, the set of data may include atmospheric data (e.g., temperature, atmospheric pressure, and humidity), medical data (e.g., patient ages and blood pressure values), retail data (e.g., product categories, price, and sales numbers), engineering data (e.g., engine size, horsepower, and price), and the like. The set of data may include a set of predictor variables (e.g., input data, independent variable, controlled variable) and a set of target variables (e.g., output data, dependent variable, response variable). In embodiments, the set of predictor variables may map to a set of points in a predictor space (e.g., space of predictors, input space), and the set of target variables may map to a set of points in a target space. The predictor space may include a graphical representation that plots a projection of the set of predictor variables in 3D space. Each axis may represent a predictor in the model, and the location of points in the graph may specify the values of those predictors. The target space (e.g., output space) may include a graphical representation that plots a projection of the set of target variables in 2D or 3D space. Each axis may represent a target in the model, and the location of points in the graph may specify the values of those targets. As described herein, aspects of the disclosure relate to compressing the set of data into sub-clusters. In embodiments, compressing may include grouping a plurality of data points into sub-clusters based on a set of proximity values with respect to a set of predictors. The set of proximity values may include computed distance values between the plurality of data points in the predictor space. For instance, the set of proximity values may indicate how far two points are located from one another within the 3D graph of the predictor space (e.g., 0.72 units, 1.04 units). In embodiments, compressing may include grouping together those data points that have a set of proximity values that fall within a predefined range (e.g., between 0.9 and 1.1 units), or achieve a proximity threshold (e.g., distance of less than 0.5 units). In certain embodiments, compressing may including utilizing one or more cluster-feature trees to group the sub-clusters. Other methods of compressing the set of data to assemble a set of sub-clusters based on a set of proximity values are also possible.

At block 240, a set of subgroups is established. The establishing may be performed using a tightness factor. The establishing may be performed by merging a plurality of individual sub-clusters of the set of sub-clusters. Generally, establishing can include creating, formulating, generating, organizing, resolving, arranging, ascertaining, or otherwise determining the set of subgroups using the tightness factor. The set of subgroups may include a collection of one or more sub-clusters that are bundled, arranged, or organized as a subgroup. The tightness factor may include a measure of the degree or extent of the statistical correlation, association, correspondence, interdependence, or closeness of the one or more sub-clusters (e.g., the smaller the value of tightness, the less variation of the data within the sub-cluster/subgroup). In embodiments, the tightness factor may be defined as the average Euclidean distance from data points to the center/centroid of the sub-cluster/subgroup. For instance, the tightness factor may be expressed as a quantitative value such as "0.604" or "1.236." In embodiments, establishing the set of subgroups may include calculating a tightness factor for the set of sub-clusters in the target space, and merging (e.g., combining, joining, linking, uniting, consolidating) those sub-clusters that are associated with a tightness factor that achieves a threshold tightness value. Merging operations may be performed iteratively to combine all sub-clusters that achieve the threshold tightness value, at which point merging operations for the set of data may cease (e.g., no sub-clusters remain that achieve the threshold tightness value). In embodiments, establishing may include generating a plurality of permutations for candidate merge operations by computing the expected tightness values in the target space that would result from merging two or more sub-clusters, and selecting those sub-clusters that would produce the lowest tightness value in the target space to merge together to form the set of subgroups. As an example, consider a set of sub-clusters A, B, C, D, and E that are associated with tightness factors of 0.341, 0.382, 0.468, 0.582, and 0.664 respectively. The set of sub-clusters may be associated with a threshold tightness value of "0.600." Accordingly, establishing may include merging sub-cluster A with sub-cluster B to form a first subgroup, and merging sub-cluster C with sub-cluster D to form a second subgroup (e.g., as each of these sub-clusters achieves the threshold tightness value of 0.600), and not merging sub-cluster E (e.g., as the threshold factor for sub-cluster E does not achieve the designated threshold tightness value). Other methods of establishing the set of subgroups by merging a plurality of individual sub-clusters of the set of sub-clusters using a tightness factor are also possible.

At block 260, a subset of the set of subgroups is selected. The selecting may be performed based on a selection criterion. Generally, selecting can include choosing, detecting, picking-out, sensing, recognizing, distinguishing, electing, or otherwise identifying the subset of the set of groups based on the selection criterion. The selection criterion may include an attribute, benchmark, norm, reference, or other parameter that governs selection of the subset of the set of subgroups. For instance, the selection criterion may indicate a property or feature of the set of subgroups that is relevant/germane to a particular usage application, analysis task, or statistical operation. As examples, the selection criterion may include a subgroup size factor (e.g., number of data points in the subgroup, number of sub-clusters in the subgroup), a subgroup tightness factor (e.g., correlation between the sub-clusters in the target space), or a subgroup isolation index (e.g., degree of seclusion of a sub-cluster with respect to other sub-clusters). In embodiments, selecting the subset of the set of subgroups may include generating a ranking of the set of subgroups based on the selection criterion, and choosing those subgroups that achieve a ranking above a designated rank position. As an example, the set of subgroups may be ranked according to subgroup size, and the subgroups that are ranked above a designated ranking of "3" may be selected as part of the subset. As another example, the set of subgroups may be ranked according to tightness factor in the target space (e.g., subgroups with smaller tightness factors may be associated with greater predictive power in a predictive analytics context), and the subgroups that are ranked above a designated ranking of "5" may be selected as part of the subset. As another example, the set of subgroups may be ranked according to isolation index (e.g., to discover subgroups which have distinguishing distributions), and the subgroups located in the top 10% may be selected as part of the subset. Other methods of selecting the subset of the set of subgroups based on the selection criterion are also possible.

At block 280, a set of insight data is compiled. The set of insight data may indicate a profile of the subset of the set of subgroups with respect to the set of data. The compiling may be performed for the subset of the set of subgroups. Generally, compiling can include collecting, assembling, formulating, accumulating, aggregating, arranging, organizing, or otherwise generating the set of insight data. The set of insight data may include a collection of information that includes a profile that indicates a relationship between the variables (e.g., data points) of the subgroup. The relationship may characterize the nature (e.g., positive relationships, inverse relationships, deterministic relationships, linear relationships, exponential relationships) or extent (e.g., low, medium, high) of correlation between the set of predictor variables and the set of target variables. As an example, the set of insight data may indicate that the distribution of data points for a variable of a particular subgroup substantially differs from the overall distribution for that variable (e.g., indicating potentially interesting or unique trends/relationships). In embodiments, compiling the set of insight data may include computing a variable importance value for the set of predictor variables and the set of target variables within the subgroups of the set of subgroups. The variable importance value may include a quantitative indication of the relevance, significance, or germaneness of a variable with respect to a particular statistical operation or topic. In embodiments, computing the variable importance value may include identifying a set of predictor variables and a set of target variables of the subset of subgroups, and comparing the distribution of data points in the subgroup with the overall distribution for that variable (e.g., as indicated by the entire set of subgroups). Based on the comparison, a profile may be generated for each variable that indicates the degree of similarity, correlation, or correspondence between the distribution for the variable within the subgroup and the overall distribution for the variable (e.g., wherein higher degrees of dissimilarity between the two distributions indicate greater importance/relevance of the variable). Other methods of compiling the set of insight data which indicates the profile of the subset of the set of subgroups are also possible.

Consider the following example. A set of data may relate to customer perception and product purchase outcomes with respect to a company. The set of data may include a set of predictor variables and a set of target variables with respect to factors of delivery speed, price level, and price flexibility. As described herein, the set of proximity values may be computed with respect to the set of predictor variables, and the set of data may be compressed to assemble a set of 9 sub-clusters. In embodiments, a tightness factor may be computed for each sub-cluster. For instance, sub-clusters A, B, C, D, E, F, G, H, and I may be associated with tightness factors of 0.823, 1.225, 0.876, 0.980, 0.606, 1.160, 1.033, 0.683, and 0.883, respectively. The set of sub-clusters may be ranked according to tightness factor, and a series of permutations may be computed to calculate the expected tightness value that would result in the target space by merging 2 or more sub-clusters. As an example, a permutation may be computed for sub-cluster H (e.g., tightness of 0.683) and sub-cluster I (e.g., tightness of 0.883) that indicates that merging sub-clusters H and I would result in a tightness value of 0.877 in the target space. The resultant tightness value may be compared with a threshold tightness value of "0.8," which may ascertain that the resultant tightness value does not achieve the threshold tightness value (i.e., 0.877 exceeds the threshold value of 0.8). As described herein, permutations may be computed for other sub-clusters of the set of sub-clusters, and it may be ascertained that combinations of sub-clusters E with H, and sub-clusters A with C result in tightness values in the target space that achieve the threshold tightness value of 0.8. Accordingly, sub-clusters E and H may be merged to form a first subgroup, and sub-clusters A and C may be merged to form a second subgroup. The first and second subgroups may be compared with respect to a selection criterion (e.g., tightness), and the first subgroup may be selected (i.e., as it has a lower tightness value in the target space than the second subgroup). Based on the first subgroup, a set of insight data may be compiled that indicates a profile characterizing the degree of correlation between the distribution of the variables in the first subgroup and the overall distribution for those variables. Other methods of data insight discovery using a clustering technique are also possible.

Method 200 concludes at block 299. Aspects of method 200 relate to data insight discovery using a clustering technique. Aspects may have performance or efficiency benefits. As an example, compiling a set of insight data may facilitate understanding of phenomena related to the collected data as well as the behavior that the data indicates. Leveraging tightness-based sub-cluster merging with respect to data clustering techniques may be associated with benefits such as statistical inference accuracy, insight extraction, and data relevance. Aspects may save resources such as bandwidth, disk, processing, or memory.

Figure 3:
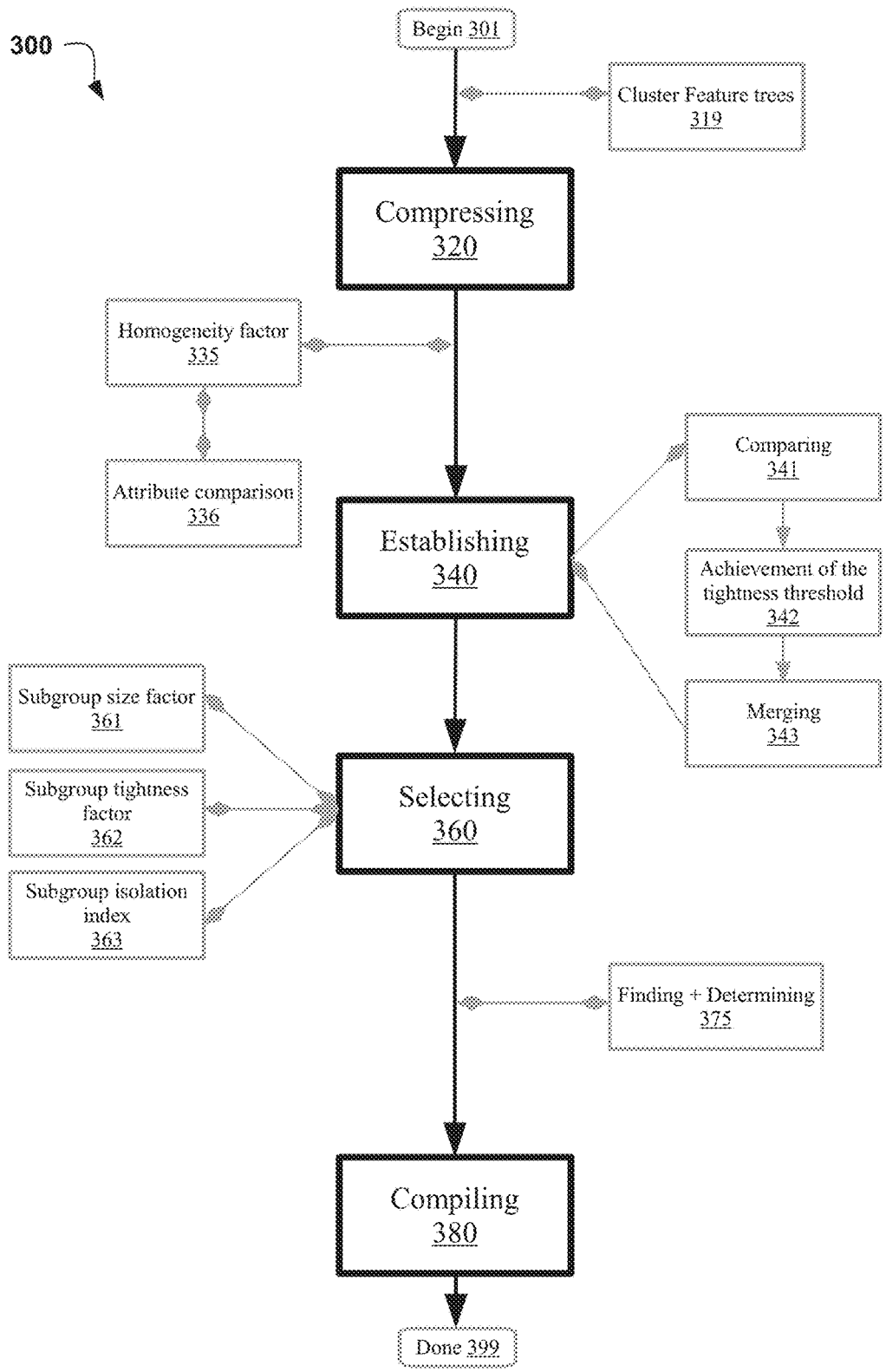
FIG. 3 is a flowchart illustrating a method for data insight discovery using a clustering technique, according to embodiments.

FIG. 3 is a flowchart illustrating a method 300 for data insight discovery using a clustering technique, according to embodiments. Aspects of the method 300 relate to data insight discovery using one or more of a set of Cluster Feature trees, a homogeneity factor, an attribute comparison, a tightness threshold, a subgroup size factor, a subgroup tightness factor, a subgroup isolation index, or a weightiness factor. Aspects of method 300 may be similar or the same as aspects of method 200, and aspects may be utilized interchangeably. The method 300 may begin at block 301.

In embodiments, a set of Cluster Feature (CF) trees may be constructed at block 319. The constructing may be performed using a sequential clustering technique to scan the set of data on a record-by-record basis. The constructing may be performed to compress the set of data. Generally, constructing can include building, assembling, formulating, generating, arranging, establishing, or otherwise structuring the set of Cluster Feature trees. The set of Cluster Feature trees may include data structures including multiple levels of nodes, where each node includes a number of entries. The set of Cluster Feature trees may indicate the number of records, mean, and variance of each continuous variable of the set of data, and count for each category of each categorical variable. Each entry (e.g., leafy entry) of a Cluster Feature tree may represent a sub-cluster. In embodiments, constructing the set of Cluster Feature trees may include using the sequential clustering technique to scan the set of data (e.g., starting with an initial tightness value such as 0), and determine if a particular variable (e.g., record) may be merged with a previously formed sub-cluster without breaking a current tightness threshold, or if a new sub-cluster should be formed. In the event that available memory resources run out before data scanning is finished, the initial tightness value may be increased to rebuild a new Cluster Feature tree by re-inserting the leaf entries of the previous Cluster Feature tree into the new one. After the old leaf entries have been re-inserted, scanning of the set of data may be resumed from the record at which it was interrupted. In certain embodiments, (e.g., cases when the set of data is large and distributed across multiple data splits), one Cluster Feature tree may be built on each split so as to generate multiple Cluster Feature trees. In this way, the set of data may be bundled into sub-clusters and stored within a Cluster Feature tree to facilitate data compression and assembly of the set of sub-clusters. Other methods of constructing the set of Cluster Feature trees are also possible.

At block 320, a set of data is compressed. The compressing may be performed based on a set of proximity values with respect to a set of predictors. The compressing may be performed to assemble a set of sub-clusters. In embodiments, the set of subgroups may be established at block 335. The establishing may be performed using a homogeneity factor with respect to the set of predictors. The establishing may be performed by merging the plurality of individual sub-clusters of the set of sub-clusters. Generally, establishing can include creating, formulating, generating, organizing, resolving, arranging, ascertaining, or otherwise determining the set of subgroups using a homogeneity factor with respect to the set of predictors. The homogeneity factor may include a trait, attribute, property, or parameter that indicates the extent or degree with which variability (e.g., variation, divergence) changes within the data points of the set of sub-clusters (e.g., sub-clusters in which data values have a great deal of variability may be considered to have low homogeneity factors, while sub-clusters which have low variability may be considered to have high homogeneity factors). As an example, the homogeneity factor may be expressed as an integer value between 1 and 100, where greater values indicate greater homogeneity (e.g., less variability) within the set of predictors (e.g., predictor variables) for a sub-cluster. In embodiments, establishing the set of subgroups using the homogeneity factor may include defining a merge criterion that only allows merging of sub-clusters that are closer to each other than any other sub-cluster (e.g., preventing merging of two sub-clusters if either of them is closer to a different sub-cluster). As such, sub-clusters may be merged with other sub-clusters sharing a similar level of homogeneity to establish the set of subgroups. Other methods of establishing the set of subgroups using a homogeneity factor with respect to the set of predictors are also possible.

In embodiments, the plurality of individual sub-clusters of the set of sub-clusters may be evaluated at block 336. The evaluating may be performed based on an attribute comparison with one or more other individual sub-clusters of the set of sub-clusters. The evaluating may be performed to establish the set of subgroups using the homogeneity factor with respect to the set of predictors. Generally, evaluating can include appraising, analyzing, investigating, inspecting, assessing, or otherwise examining the plurality of individual sub-clusters based on an attribute comparison with one or more other individual sub-clusters of the set of sub-clusters. The attribute comparison may include a parallel examination of one or more traits, properties, elements, or characteristics of a first sub-cluster with corresponding traits, properties, elements, or characteristics of a second sub-cluster.

For instance, evaluating may include contrasting the tightness factor, subgroup size factor, subgroup isolation factor, or homogeneity factor of a first sub-cluster with the corresponding attribute of a second sub-cluster, and merging those sub-clusters that have attributes that achieve an attribute similarity criterion (e.g., deviation of less than 5%, deviation of less than 10%). As an example, a first sub-cluster having a homogeneity factor (e.g., in the predictor space) of 54 may be compared with a second sub-cluster having a homogeneity factor of 57. In certain embodiments, the difference in the homogeneity factors for the first and second sub-clusters may be compared with a homogeneity deviation threshold of 5%, and it may be determined that the difference in the homogeneity factors achieves the homogeneity deviation threshold. Accordingly, the first and second sub-clusters may be merged together as a sub-group.

In certain embodiments, establishing the set of subgroups may include using an information criterion. The information criterion may include a measure of the relative quality of statistical models for the set of data. For instance, establishing the set of subgroups using the homogeneity factor may include defining a merge criterion that only allows merging between subgroups when the information criterion (e.g., Akaike information criterion, Bayesian information criterion) resulting from merging the subgroups is less than the information criterion resulting from maintaining the sub-clusters separately. Other methods of evaluating the plurality of individual sub-clusters of the set of sub-clusters to establish the set of subgroups are also possible.

At block 340, a set of subgroups is established. The establishing may be performed using a tightness factor. The establishing may be performed by merging a plurality of individual sub-clusters of the set of sub-clusters. In embodiments, a first tightness factor for a first individual sub-cluster may be compared with a tightness threshold at block 341. A second tightness factor for a second individual sub-cluster may be compared with the tightness threshold. Generally, comparing can include analyzing, contrasting, investigating, analyzing, juxtaposing, correlating, or otherwise evaluating the first tightness factor for the first individual sub-cluster and the second tightness factor for the second individual sub-cluster with the tightness threshold. The tightness threshold may include a designated tightness factor value, range of values, maximum value (e.g., ceiling), or minimum value (e.g. floor) that represents a benchmark, reference, or criterion for determining which sub-clusters may be merged and which sub-clusters should remain separate.

For instance, the tightness threshold may include a tightness value of "0.750" (e.g., such that sub-clusters with tightness factors in the target space above the tightness threshold are not allowed to merge) or a tightness value range of "0.000-0.800" (e.g., such that only those sub-clusters that fall within the defined range may be merged). In embodiments, comparing the first and second tightness factors with the tightness threshold may include ascertaining a relationship between the magnitude of the first and second tightness factors with respect to the tightness threshold. Consider the following example. A set of data may be associated with a tightness threshold of "0.700." In embodiments, a first tightness factor of "0.668" for a first individual sub-cluster and a second tightness factor of "0.309" for a second individual sub-cluster may be compared with the tightness threshold of "0.700," and it may be determined that both the first and second tightness factors are less than then tightness threshold. Other methods of comparing the first tightness factor for the first individual sub-cluster and the second tightness factor for the second individual sub-cluster with respect to the tightness threshold are also possible.

In embodiments, achievement of the tightness threshold by both the first and second tightness factors for the first and second individual sub-clusters may be ascertained at block 342. The plurality of individual sub-clusters may include the first and second individual sub-clusters. Generally, ascertaining can include computing, formulating, generating, resolving, calculating, selecting, identifying, or otherwise determining achievement of the tightness threshold by both the first and second tightness factors for the first and second individual sub-clusters. In embodiments, ascertaining achievement of the tightness threshold by both the first and second tightness factors may include resolving that the first and second tightness factors fall within a tightness threshold range (e.g., 0.000-0.800), are less than a maximum tightness threshold value (e.g., less than a threshold of 0.750), or are greater than a minimum tightness threshold value (e.g., 0.100). For instance, with reference to the previous example, in response to comparing the first tightness factor of "0.668" for the first individual sub-cluster and the second tightness factor of "0.309" for the second individual sub-cluster with respect to the maximum tightness threshold of "0.700," it may be ascertained that both the first and second tightness factors achieve the tightness threshold (e.g., as both 0.668 and 0.309 are less than the designated maximum tightness threshold of 0.700). Other methods of ascertaining achievement of the tightness threshold by both the first and second tightness factors for the first and second individual sub-clusters are also possible.

In embodiments, the plurality of individual sub-clusters of the set of sub-clusters may be merged at block 343. Generally, merging can include joining, incorporating, linking, uniting, melding, fusing, consolidating, assimilating, converging, or otherwise combining the plurality of individual sub-clusters. Merging may be performed in response to ascertaining achievement of the tightness threshold by the plurality of individual sub-clusters. In embodiments, merging may include combining the set of predictor variables and the set of target variables for each individual sub-cluster of the plurality of sub-clusters into a subgroup having a single data set that includes the predictor variables and the target variables for each merged sub-cluster. In embodiments, merging may include iteratively fusing sub-clusters one-by-one until each sub-cluster that achieves the tightness threshold is included in a subgroup (e.g., has been merged with at least one another sub-cluster). After each merge operation, tightness factors for the set of sub-clusters and newly formed sub-groups may be recomputed based on their proximity to other sub-clusters/sub-groups in the target space. In certain embodiments, merging may include computing an expected tightness value in the target space that will result from the merging of two or more sub-clusters, and subsequently merging the sub-clusters so as to result in the lowest possible tightness value for each resulting sub-group.

As an example, consider a set of four sub-clusters A, B, C, and D associated with tightness values of 0.824, 0.899, 0.791, and 0.685, respectively (e.g., where each tightness value achieves a tightness threshold of 0.900). Accordingly, merging may include computing expected tightness values in the target space for each combination of sub-clusters A, B, C, and D, and ascertaining that merging of sub-clusters C and D into a first subgroup and merging of sub-clusters A and B into a second subgroup results in the lowest tightness values in the target space. As such, sub-clusters C and D may be merged into the second subgroup and sub-clusters A and B may be merged into the first subgroup. Other methods of merging the plurality of individual sub-clusters of the set of sub-clusters are also possible.

At block 360, a subset of the set of subgroups is selected. The selecting may be performed based on a selection criterion. In embodiments, the selection criterion may be configured to include a subgroup size factor at block 361. The subgroup size factor may include an indication of the extent of the capacity, content, range, scope, volume, or magnitude of a particular subgroup. For instance, the subgroup size factor may include a measure of the number of sub-clusters in a particular subgroup (e.g., 4), or the number of data points in a particular subgroup (e.g., 250). In embodiments, the selection criterion may be configured to include a subgroup tightness factor at block 362. The subgroup tightness factor may include a measure of the degree or extent of statistical correlation, association, correspondence, interdependence, or closeness of the sub-clusters or data points within the subgroup (e.g., the smaller the value of tightness, the less variation of the data within the subgroup). In embodiments, the tightness factor may be defined as the average Euclidean distance from data points in the subgroup to the center/centroid of the subgroup. As an example, the subgroup tightness factor may include a value of "0.765." In embodiments, the selection criterion may be configured to include a subgroup isolation index at block 363. The subgroup isolation index may include an indication of the degree or extent of seclusion of a particular subgroup from other subgroups in the predictor space. For instance, the subgroup isolation index may include a measure of the average distance between one subgroup and one or more other subgroups in the predictor space (e.g., 1.338 units, 2.641 units of separation). Other types of selection criterion are also possible.

In embodiments, one or more data clusters may be found at block 375. One or more data clusters may be found without a reliance on decision rules that define subspaces. The finding may be performed to select the subset of the set of subgroups. Generally, finding can include sensing, discovering, computing, recognizing, distinguishing, ascertaining, or otherwise determining the one or more data clusters without the decision rules that define subspaces. The one or more data clusters may include a collection of one or more data points, sub-clusters, sub-groups, sets of variables, or other groups of data with respect to the predictor space or the target space. The decision rules that define subspaces may include one or more guidelines, standards, or principles that select data clusters (e.g., arbitrarily) within the target space or the predictor space. In embodiments, finding the one or more data clusters without a reliance on decision rules may include evaluating multiple targets (e.g., output values) in terms of distribution unbalance in the target space, and identifying groups of data points with a tightness factor below a threshold value (e.g., independent of/without using the set of decision rules).

In embodiments, the set of insight data may be determined. The determining may be performed based on a weightiness factor. Generally, determining can include computing, formulating, generating, resolving, calculating, selecting, identifying, or otherwise ascertaining the set of insight data based on the weightiness factor. The weightiness factor may indicate a relative threshold difference of the subset of the set of subgroups with respect to the set of data. The weightiness factor may include a quantitative indication of the relevance, significance, or germaneness of one or more subgroups with respect to one or more other subgroups of the set of subgroups. In embodiments, computing the weightiness factor may include identifying a set of predictor variables and a set of target variables of the subset of the set of subgroups and comparing the distribution of data points in the subgroup with the overall distribution for that variable (e.g., as indicated by the entire set of subgroups). Based on the comparison, a profile may be generated for each variable that indicates the degree of similarity, correlation, or correspondence between the distribution for the variable within the subgroup and the overall distribution for the variable (e.g., wherein higher degrees of dissimilarity between the two distributions indicate greater importance/relevance of the variable). Accordingly, determining the set of insight data may include extracting one or more relationships based on the correlation between the predictor variables and the target variables of the subset of the set of subgroups. Other methods of finding the set of data clusters without a reliance on decision rules that define subspaces and determining the set of insight data using a weightiness factor are also possible.

At block 380, a set of insight data is compiled. The set of insight data may indicate a profile of the subset of the set of subgroups with respect to the set of data. The compiling may be performed for the subset of the set of subgroups. Method 300 concludes at block 399. Aspects of method 300 relate to data insight discovery using a clustering technique. Altogether, leveraging tightness-based sub-cluster merging with respect to data clustering techniques may be associated with benefits such as statistical inference accuracy, insight extraction, and data relevance. Aspects may have performance or efficiency benefits. Aspects may save resources such as bandwidth, disk, processing, or memory.

Figure 4:
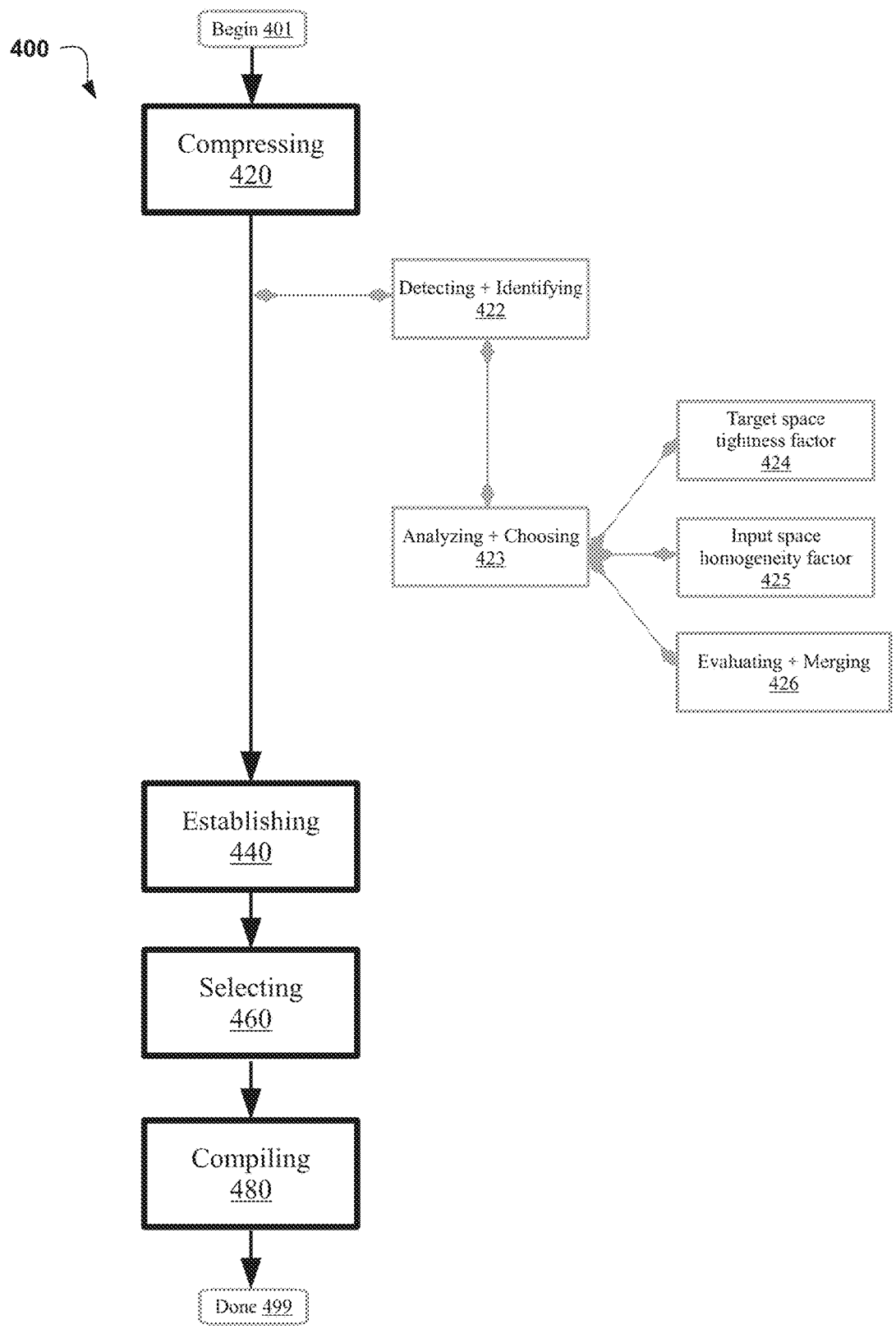
FIG. 4 is a flowchart illustrating a method for data insight discovery using a clustering technique, according to embodiments.

FIG. 4 is a flowchart illustrating a method 400 for data insight discovery using a clustering technique, according to embodiments. Aspects of the method 400 relate to data insight discovery using a clustering technique to merge a plurality of individual sub-clusters using a tightness factor. Aspects of method 400 may be similar or the same as aspects of method 200/300, and aspects may be utilized interchangeably. The method 400 may begin at block 401. At block 420, a set of data is compressed. The compressing may be performed based on a set of proximity values with respect to a set of predictors. The compressing may be performed to assemble a set of sub-clusters.

In embodiments, the set of sub-clusters may be detected at block 422. Generally, detecting can include sensing, discovering, computing, calculating, distinguishing, ascertaining, or otherwise determining the set of sub-clusters. Detecting the set of sub-clusters may include analyzing the data points located in the predictor space and the target space, and recognizing a statistical trend, correlation (e.g., tightness below a threshold), pattern, link, or other correspondence that indicates a relationship between the data points (e.g., indicating a cluster). In embodiments, a set of sub-cluster pairs of the set of sub-clusters may be identified. Generally, identifying can include sensing, discovering, computing, recognizing, distinguishing, ascertaining, or otherwise determining the set of sub-clusters pairs. The set of sub-cluster pairs may include a collection of sub-clusters in which each sub-cluster is associated, connected, correlated, or linked with another sub-cluster of the set of sub-clusters. Identifying the set of sub-cluster pairs may include tagging pairs of sub-clusters with a set of unchecked status indicators to mark them as unchecked pairs. The unchecked pairs may include sub-clusters that are candidates for a merge operation (e.g., two sub-clusters that are located within a threshold distance from one another in the target space or the predictor space).

In embodiments, the set of sub-cluster pairs of the set of sub-clusters may be analyzed at block 423. Generally, analyzing can include appraising, investigating, inspecting, probing, assessing, parsing, or otherwise examining the set of sub-cluster pairs of the set of sub-clusters. In embodiments, analyzing may include examining the set of sub-cluster pairs to compute the distance, proximity, tightness, or statistical correlation between the set of sub-cluster pairs (e.g., calculating a distance of 1.211 units). In embodiments, a chosen pair of the set of sub-cluster pairs of the set of sub-clusters may be chosen. The choosing may be performed based on a proximity factor in an input space. Generally, choosing can include detecting, picking-out, sensing, recognizing, distinguishing, electing, selecting or otherwise identifying a chosen pair of the set of sub-cluster pairs. The chosen pair may include two (e.g., or more) sub-clusters that are determined to be located within a threshold distance from one another in the input space (e.g., predictor space) based on the proximity factor. As an example, choosing may include computing the Euclidian distance between the sub-clusters of the chosen pair, and ascertaining that the distance between the sub-clusters achieves a threshold distance indicated by the proximity factor (e.g., less than 1.300 units apart).

In embodiments, a merge operation may be evaluated at block 424. Generally, evaluating can include appraising, analyzing, investigating, inspecting, assessing, or otherwise examining the merge operation with respect to the chosen pair of the set of sub-cluster pairs of the set of sub-clusters. The evaluating may be performed using a target space tightness factor. As described herein, the target space factor may include a measure of the degree or extent of the statistical correlation, association, correspondence, interdependence, or closeness of the one or more sub-clusters in the target space (e.g., the smaller the value of tightness, the less variation of the data within the sub-cluster/subgroup). In embodiments, evaluating the chosen pair using the target space tightness factor may include computing a tightness factor with respect to the sub-clusters of the chosen pair in the target space, and ascertaining whether the tightness factor achieves a target space tightness factor (e.g., 0.715).

In certain embodiments, evaluating may include grouping the sub-clusters into bins by tightness value (e.g., low, medium, and high tightness). In embodiments, a merge operation may be evaluated at block 425. The evaluating may be performed with respect to the chosen pair of the set of sub-cluster pairs of the set of sub-clusters. The evaluating may be performed using an input space homogeneity factor. The input space homogeneity factor may include a trait, attribute, property, or parameter that indicates the extent or degree with which variability (e.g., variation, divergence) changes within the data points of the set of sub-clusters in the input space (e.g., predictor space). Evaluating the chosen pair using the input space homogeneity factor may include calculating the degree of variability within the data points of the set of sub-clusters, and ascertaining whether the variability achieves a threshold input space homogeneity factor (e.g., variability of less than 5%).

In embodiments, a merge operation may be evaluated at block 426. The evaluating may be performed with respect to the chosen pair of the set of sub-cluster pairs of the set of sub-clusters. The evaluating may be performed using both a target space tightness factor and an input space homogeneity factor. In embodiments, evaluating may include comparing the target space tightness value and the input space homogeneity factor for the sub-clusters of the chosen pair with respective target space tightness value thresholds (e.g., less than 0.680) and input space homogeneity factor thresholds (e.g., more than 95% homogeneity), and determining that the chosen pair achieves both the target space tightness value threshold and the input space homogeneity factor threshold (e.g., the chosen pair is sufficiently tight in the target space and sufficiently homogenous in the input space). The chosen pair of the set of sub-cluster pairs of the set of sub-clusters may be merged. The merging may be performed based on evaluating the merge operation. Generally, merging can include joining, incorporating, linking, uniting, melding, fusing, consolidating, assimilating, converging, or otherwise combining the chosen pair. In embodiments, merging may include fusing or combining the chosen pair in a single sub-group in response to evaluation of the merge operation and determining that the chosen pair achieves the target space tightness value threshold and input space homogeneity factor threshold. Other methods of evaluating the merge operation are also possible.

At block 440, a set of subgroups is established. The establishing may be performed using a tightness factor. The establishing may be performed by merging a plurality of individual sub-clusters of the set of sub-clusters. At block 460, a subset of the set of subgroups may be selected. The selecting may be performed based on a selection criterion. At block 480, a set of insight data may be compiled. The set of insight data may indicate a profile of the subset of the set of subgroups with respect to the set of data. The compiling may be performed for the subset of the set of subgroups. Method 400 concludes at block 499. Aspects of method 400 relate to data insight discovery using a clustering technique. Altogether, leveraging tightness-based sub-cluster merging with respect to data clustering techniques may be associated with benefits such as statistical inference accuracy, insight extraction, and data relevance. Aspects may have performance or efficiency benefits. Aspects may save resources such as bandwidth, disk, processing, or memory.

Figure 5:
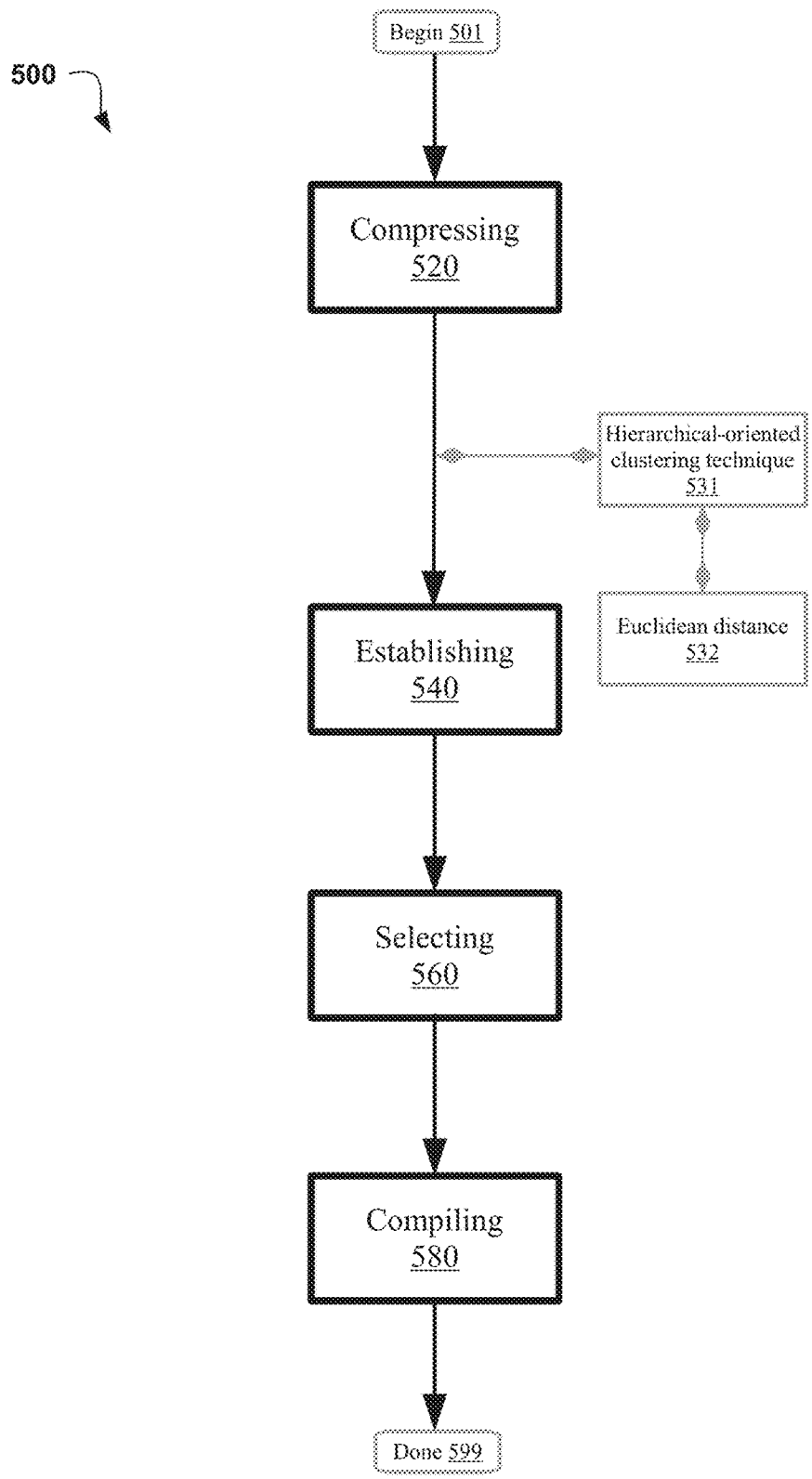
FIG. 5 is a flowchart illustrating a method for data insight discovery using a clustering technique, according to embodiments.

FIG. 5 is a flowchart illustrating a method 500 for data insight discovery using a clustering technique, according to embodiments. Aspects of method 500 relate to data insight discovery using a hierarchical-oriented clustering technique that uses a tightness factor based on a Euclidean distance to indicate an appropriateness of a merge operation. Aspects of method 500 may be similar or the same as aspects of method 200/300/400, and aspects may be utilized interchangeably. The method 500 may begin at block 501. At block 520, a set of data is compressed. The compressing may be performed based on a set of proximity values with respect to a set of predictors. The compressing may be performed to assemble a set of sub-clusters.

In embodiments, the clustering technique may be configured at block 531. The clustering technique may be configured to include a hierarchical-oriented clustering technique. The hierarchical-oriented clustering technique may use the tightness factor to indicate an appropriateness of a merge operation. Generally, configuring can include formulating, arranging, instructing, setting-up, computing, or otherwise structuring the clustering technique to include the hierarchical-oriented clustering technique. The hierarchical-oriented clustering technique may include a statistical analysis technique configured to build a hierarchy of clusters. The hierarchical clustering method may include an agglomerative method (e.g., observations are made in individual clusters, and pairs of clusters are merged moving up the hierarchy), a divisive method (e.g., observations are made in one cluster, and splits are performed recursively moving down the hierarchy), or other clustering method. In embodiments, the hierarchical-oriented clustering technique may be configured to monitor both the tightness and homogeneity of sub-clusters or sub-groups in a target space, and ascertain merge operations to be appropriate when the sub-clusters/sub-groups achieve tightness and homogeneity levels below a threshold (e.g., tightness of less than 0.545, homogeneity of greater than 90%).

In embodiments, the tightness factor may be determined based on a Euclidean distance at block 532. Generally, determining can include computing, formulating, generating, resolving, calculating, selecting, identifying, or otherwise ascertaining the tightness factor based on a Euclidean distance. The Euclidean distance may include the distance between two data points, sub-clusters, or sub-groups from one another in Euclidean space (e.g., of the target space or predictor space). In embodiments, the tightness factor may include the average Euclidean distance from a data point/sub-cluster/sub-group to the center/centroid of the sub-cluster/subgroup. As an example, the tightness factor may be expressed a count, mean, and sum of squares of a target in the subgroup respectively, an index of the subgroup, and the number of targets. Other methods of configuring the hierarchical-oriented clustering technique and determining the tightness factor based on a Euclidean distance are also possible.

At block 540, a set of subgroups is established. The establishing may be performed using a tightness factor. The establishing may be performed by merging a plurality of individual sub-clusters of the set of sub-clusters. At block 560, a subset of the set of subgroups is selected. The selecting may be performed based on a selection criterion. At block 580, a set of insight data is compiled. The set of insight data may indicate a profile of the subset of the set of subgroups with respect to the set of data. The compiling may be performed for the subset of the set of subgroups. Method 500 concludes at block 599. Aspects of method 500 relate to data insight discovery using a clustering technique. Aspects may have performance or efficiency benefits. Aspects may save resources such as bandwidth, disk, processing, or memory.

Figure 6:
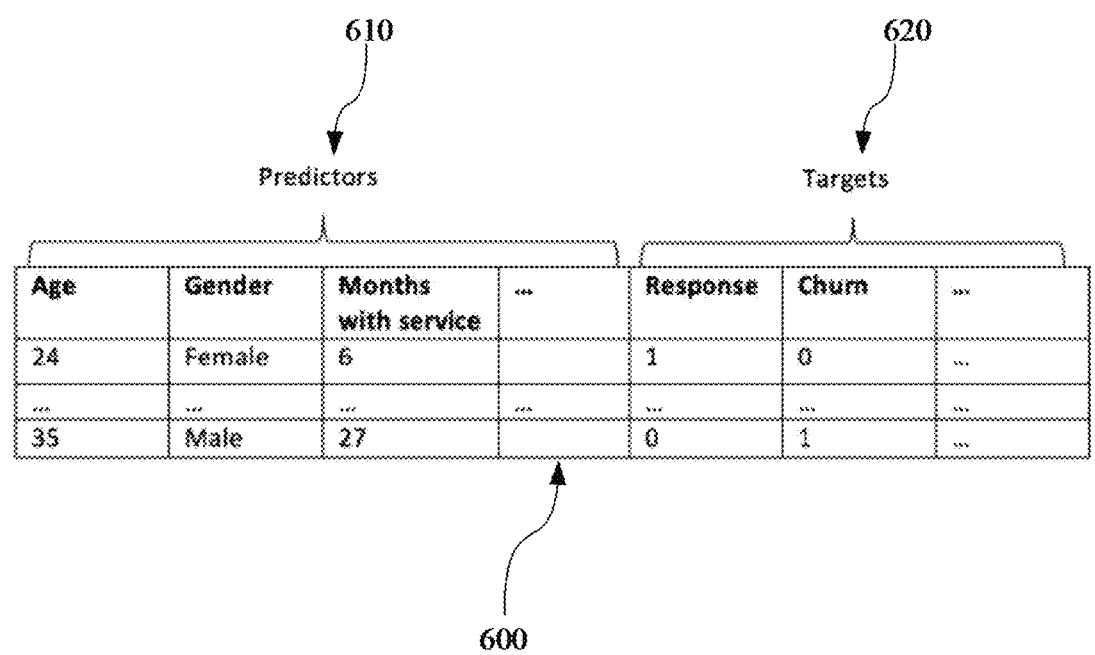
FIG. 6 illustrates an example of data insight discovery using a clustering technique, according to embodiments.

FIG. 6 illustrates an example of data insight discovery using a clustering technique, according to embodiments. FIG. 6 illustrates a column-based dataset 600 containing a set of variables. The set of variables may be continuous or categorical, and be specified as either predictors or targets. For instance, as shown in FIG. 6, the column-based dataset 600 may include a set of predictor variables 610 and a set of target variables 620. As an example, the set of predictor variables 610 may include variables of age, gender, and months with service, and the set of target variables 620 may include variables of response and churn. As described herein, the set of variables may be represented in a predictor space and a target space, and be managed using a clustering technique to compile a set of insight data that indicates a relationship between the set of predictor variables 610 and the set of target variables 620. Other examples of column-based datasets and sets of variables are also possible.

Figure 7:
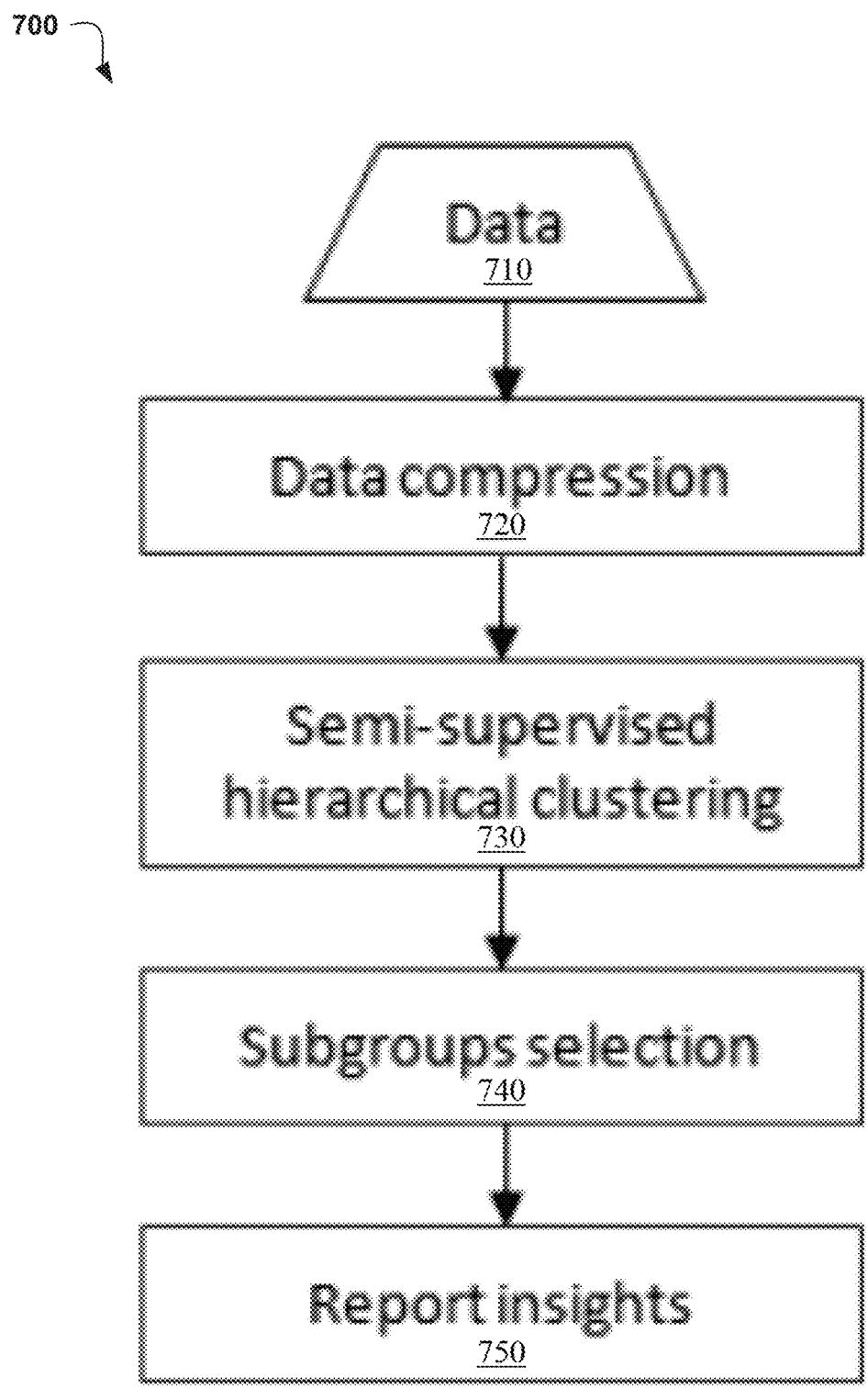
FIG. 7 illustrates an example of data insight discovery using a clustering technique, according to embodiments.

FIG. 7 illustrates an example of data insight discovery using a clustering technique, according to embodiments. FIG. 7 relates to a method 700 for a workflow of extracting insights from a set of subgroups. As described herein, a set of data 710 may be compressed into small sub-clusters at block 720 according to computed distances among points in the space of predictors. The compression may be used to prepare the set of data 710 for processing by a hierarchical clustering technique. In certain embodiments, the set of data 710 may be compressed using a CF-tree method. At block 730, the set of sub-clusters obtained in data compression may be merged into subgroups based on tightness in the target space and homogeneity in the predictor space. In embodiments, the clustering technique may be configured to start with a set of small sub-clusters, mark all pairs of sub-clusters as unchecked pairs, select the closest pair of sub-clusters in the input space from all unchecked pairs, check that tightness in the target space of the sub-cluster formed by the selected pair is small enough (e.g., achieves a tightness threshold) with respect to remaining sub-clusters, check that the sub-clusters corresponding to the selected pair are homogenous enough in the input space (e.g., achieves a homogeneity threshold) to be merged as a cluster, merging the two sub-clusters, and iterating the processing for remaining sub-clusters (e.g., until no sub-clusters that achieve the tightness threshold and homogeneity threshold remain). At block 740, one or more subgroups of the subgroups created by the merged sub-clusters may be selected. As described herein, the one or more subgroups may be selected based on subgroup size, tightness in the target space, or isolation index. At block 750, each subgroup of interest can be profiled with respect to predictors or targets. For instance, a variable importance value may be computed for predictors and targets within the subgroup, one or more predictor variables and target variables may be selected based on the ranking (e.g., top three), and the distribution of each selected variable may be compared with the overall distribution to generate a profile indicating low, medium, or high correlation. Other methods of data insight discovery using a clustering technique are also possible.

Figure 8:
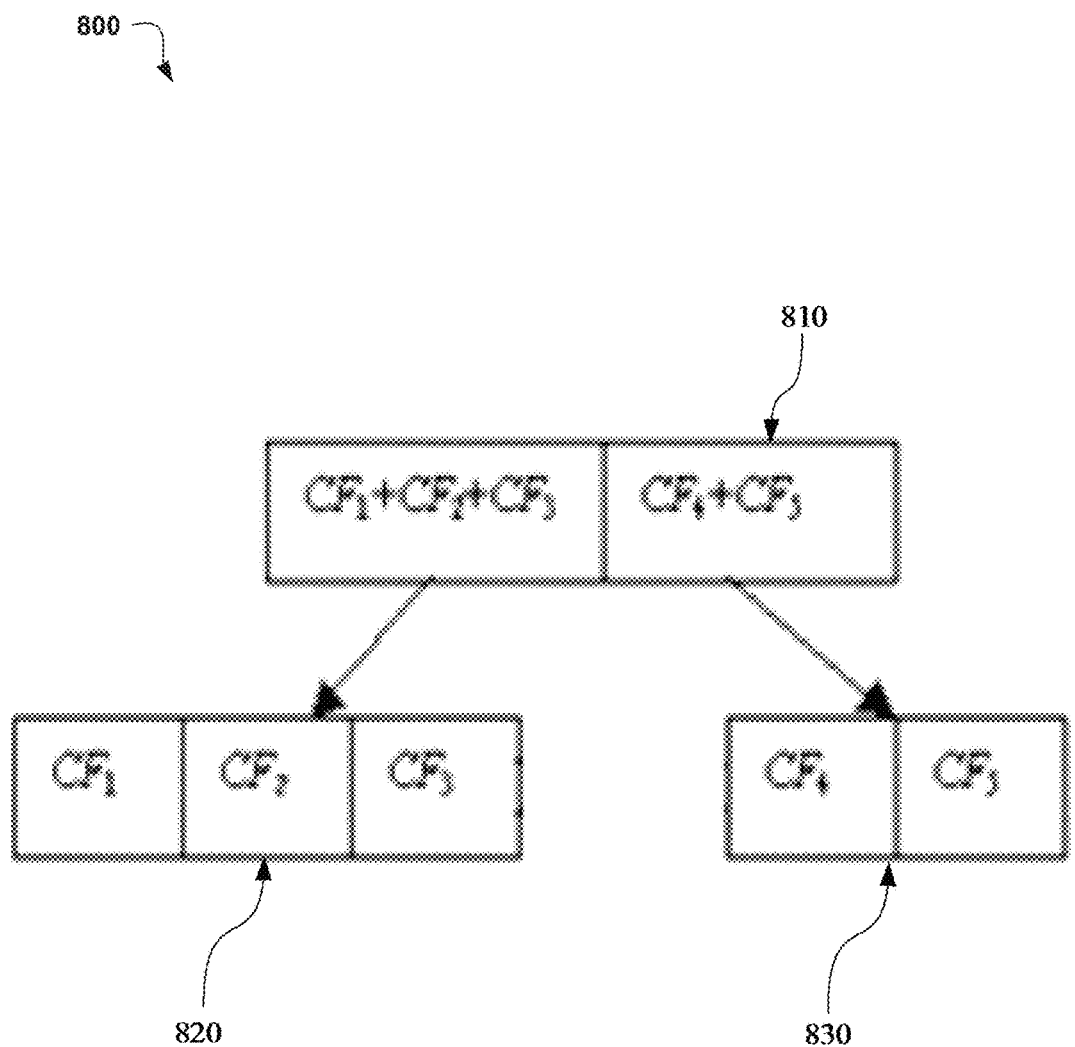
FIG. 8 illustrates an example of data insight discovery using a clustering technique, according to embodiments.

FIG. 8 illustrates an example of data insight discovery using a clustering technique, according to embodiments. FIG. 8 illustrates an example cluster feature tree 800 for data compression. The cluster feature tree 800 may include a root node 810, a first leaf node 820, and a second leaf node 830. The first leaf node 820 may include three entries (e.g., CF1, CF2, CF3) and the second leaf node 830 may include two entries (e.g., CF4, CF5). The root node 810 may have two entries which summarize the cluster features corresponding to both the first leaf node 820 and the second leaf node 830. In this way, cluster feature trees may be used to compress the set of data into clusters for processing by the clustering technique.

Figure 9:
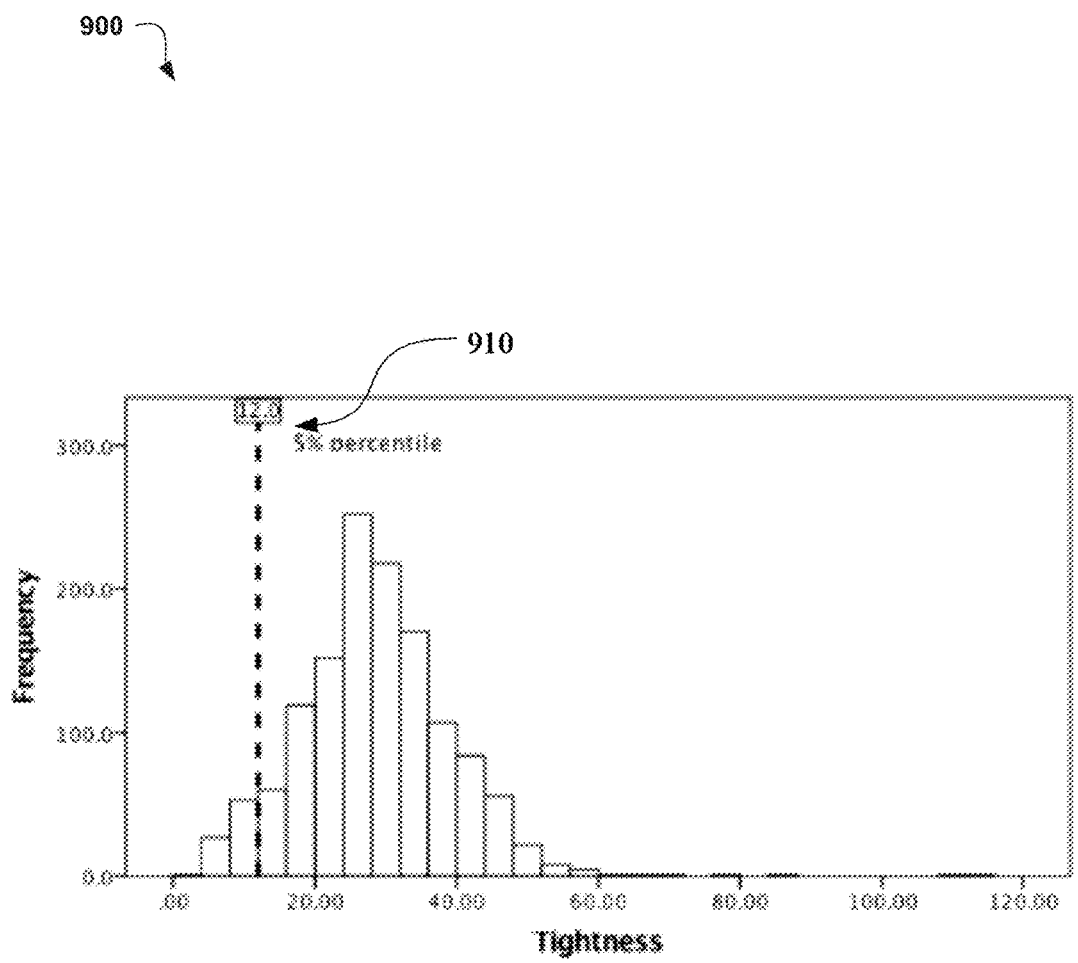
FIG. 9 illustrates an example of data insight discovery using a clustering technique, according to embodiments.

FIG. 9 illustrates an example 900 of data insight discovery using a clustering technique, according to embodiments. Aspects of FIG. 9 relate to managing tightness factors with respect to a set of sub-clusters. In embodiments, as described herein, a tightness threshold 910 may be used to govern merging of sub-clusters. As an example, as shown in FIG. 9, a tightness threshold value 910 corresponding to a percentile of 5% may be introduced, such that in the event that the tightness value of two sub-clusters in the target space is less than the value corresponding to the 5% percentile (e.g., 12) the two sub-clusters may be merged, and in the event that the tightness value of two sub-clusters in the target space is greater than the value corresponding to the 5% percentile, merging of the two sub-clusters may not be allowed. In certain embodiments, managing tightness may include grouping the tightness values for a set of sub-clusters in the target space into bins containing low, medium, and high tightness values. As such, in the event that the tightness value for a set of sub-clusters falls into the range of "low" tightness values, merging may be performed. Other methods of managing tightness with respect to a set of sub-clusters are also possible.

Figure 10:
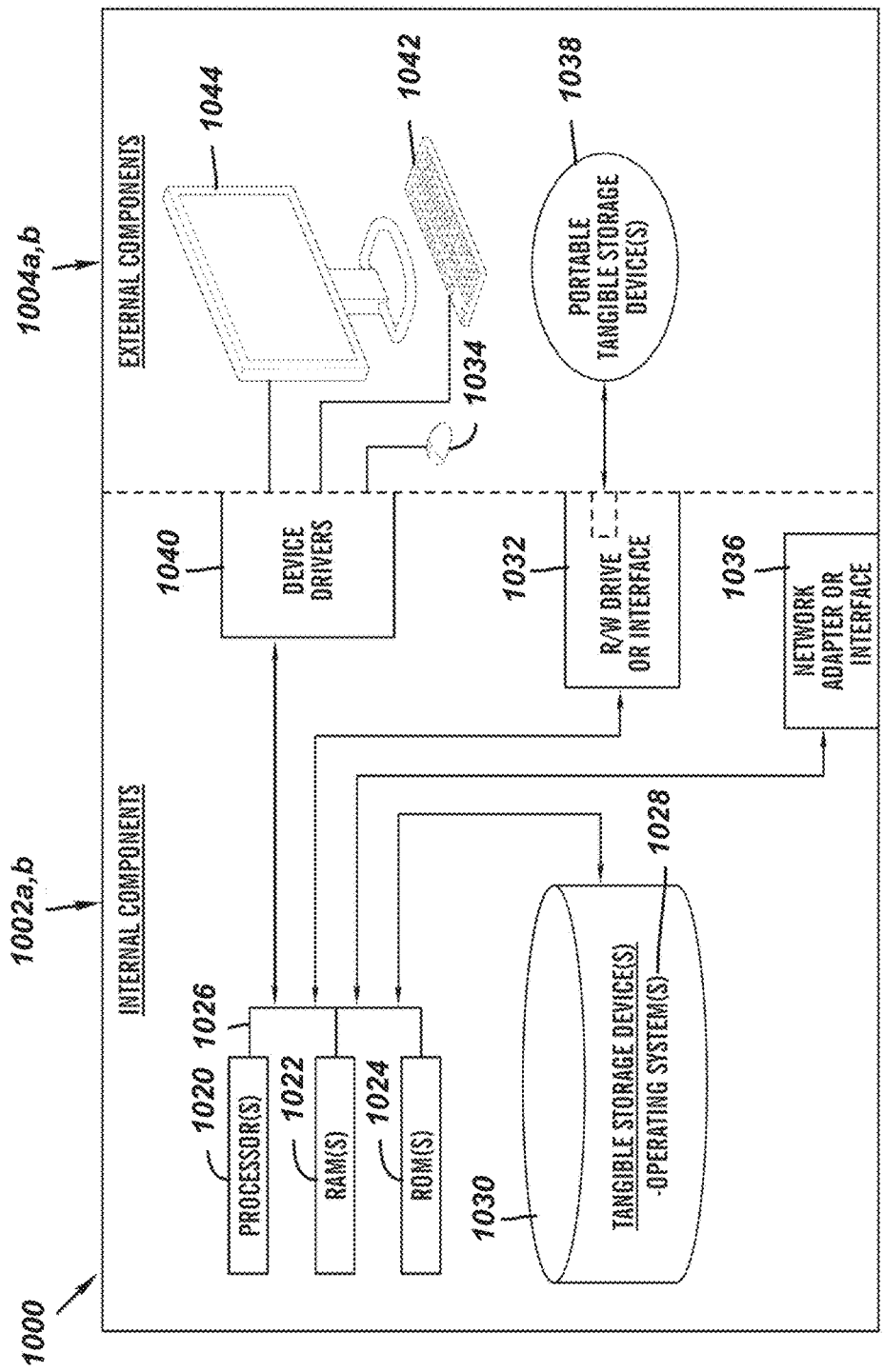
FIG. 10 is a block diagram of internal and external components of computers and servers depicted in FIG. 1 according to at least one embodiment.

FIG. 10 is a block diagram 1000 of internal and external components of the computer system 100 depicted in FIG. 1 in accordance with an embodiment of the present invention. It should be appreciated that FIG. 10 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 1002, 1004 may be representative of a smart phone, a computer system, PDA, or other electronic devices. Examples of computing systems, environments, and/or configurations that may represented by the data processing system 1002, 1004 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The computer system 100 may include respective sets of internal components 1002 *a,b* and external components 1004*a,b* illustrated in FIG. 10. Each of the sets of internal components 1002 include one or more processors 1020, one or more computer-readable RAMs 1022, and one or more computer-readable ROMs 1024 on one or more buses 1026, and one or more operating systems 1028 and one or more computer-readable tangible storage devices 1030. The one or more operating systems 1028 and the data insight discovery application 150 are stored on one or more of the respective computer-readable tangible storage devices 1030 for execution by one or more of the respective processors 1020 via one or more of the respective RAMs 1022 (which typically include cache memory). In the embodiment illustrated in FIG. 10, each of the computer-readable tangible storage devices 1030 is a magnetic disk storage device of an internal hard drive. Alternatively, each of the computer-readable tangible storage devices 1030 is a semiconductor storage device such as ROM 1024, EPROM, flash memory or any other computer-readable tangible storage device that can store a computer program and digital information.

Each set of internal components 1002*a,b* also includes a R/W drive or interface 1032 to read from and write to one or more portable computer-readable tangible storage devices 1038 such as a CD-ROM, DVD, memory stick, magnetic tape, magnetic disk, optical disk or semiconductor storage device. A software program, such as the data insight discovery application 150, can be stored on one or more of the respective portable computer-readable tangible storage devices 1038, read via the respective R/W drive or interface 1032, and loaded into the respective hard drive 1030.

Each set of internal components 1002*a,b* also includes network adapters or interfaces 1036 such as a TCP/IP adapter cards, wireless Wi-Fi interface cards, or 3G or 4G wireless interface cards or other wired or wireless communication links. The data insight discovery application 150 can be downloaded to computer system 100 from an external computer via a network (for example, the Internet, a local area network or other, wide area network) and respective network adapters or interfaces 336. From the network adapters or interfaces 1036, the data insight discovery application 150 is loaded into the respective hard drive 1030. The network may comprise copper wires, optical fibers, wireless transmission, routers, firewalls, switches, gateway computers and/or edge servers.

Each of the sets of external components 1004*a,b* can include a computer display monitor 1044, a keyboard 1042, and a computer mouse 1034. External components 1004*a,b* can also include touch screens, virtual keyboards, touch pads, pointing devices, and other human interface devices. Each of the sets of internal components 1002*a,b* also includes device drivers 1040 to interface to computer display monitor 1044, keyboard 1042, and computer mouse 1034. The device drivers 1040, R/W drive or interface 1032, and network adapter or interface 1036 comprise hardware and software (stored in storage device 1030 and/or ROM 1024).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
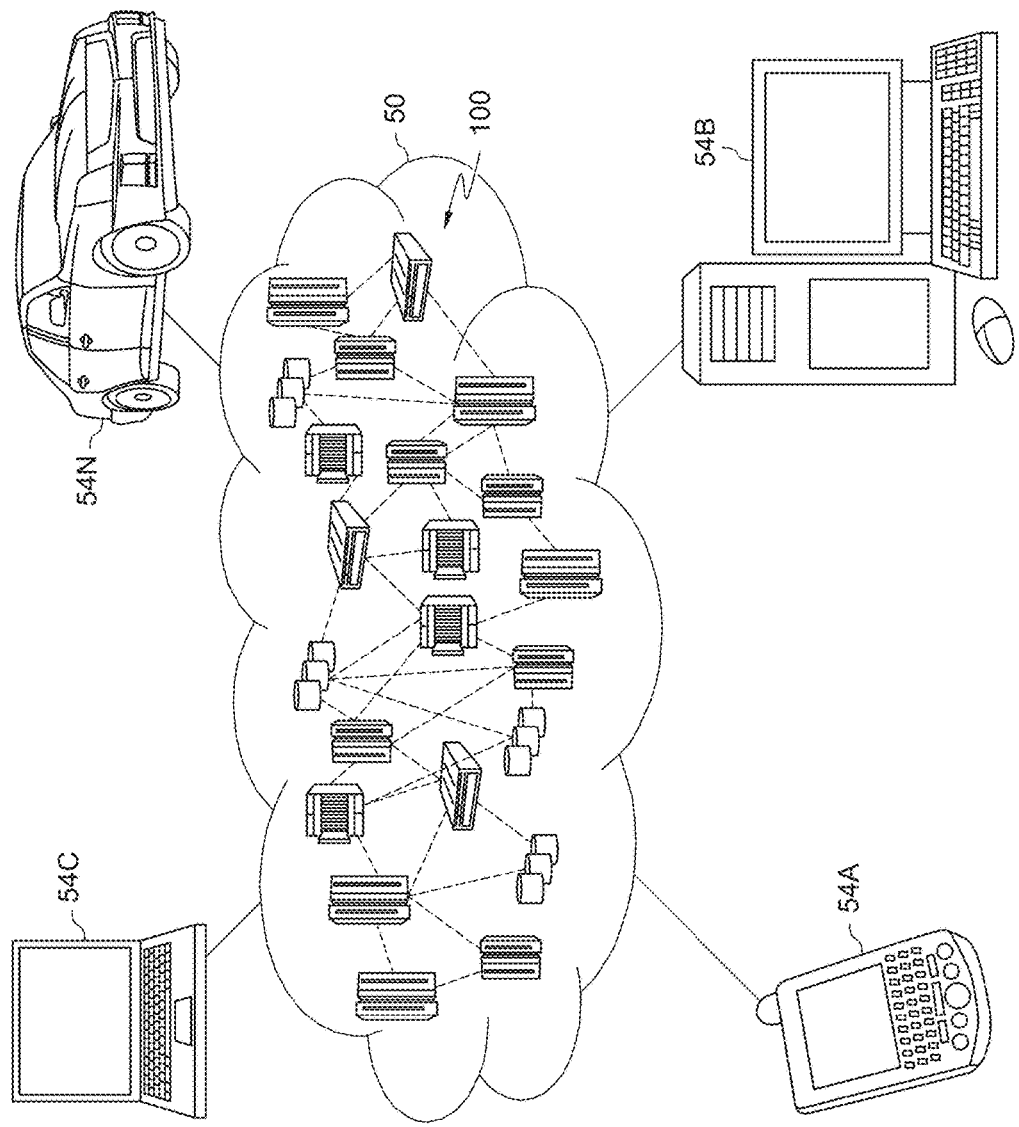
FIG. 11 depicts a cloud computing environment according to an embodiment of the present invention.

Referring now to FIG. 11, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 100 and cloud computing environment 50 can communicate with any type of computerized device over any type of network and/or network addressable connection (e.g., using a web browser).

Figure 12:
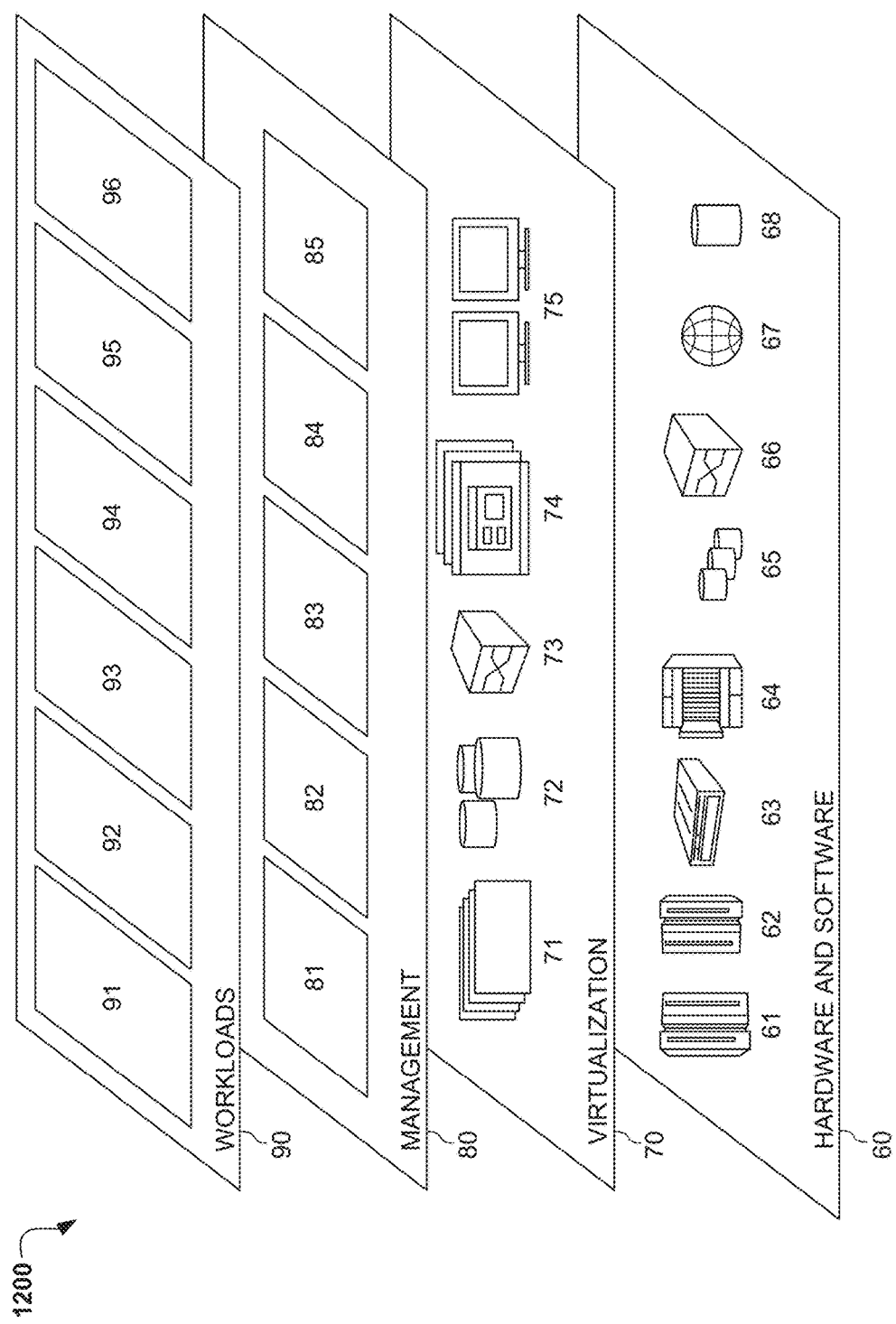
FIG. 12 depicts abstraction model layers according to an embodiment of the present invention.

Referring now to FIG. 12, a set of functional abstraction layers 1200 provided by cloud computing environment 50 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data insight discovery 96. Data insight discovery 96 may relate to efficiently detecting data subgroups that form clusters in space of predictors.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for data insight discovery using a clustering technique, the method comprising:
compressing, to assemble a set of sub-clusters, a set of data based on a set of proximity values with respect to a set of predictors and a set of targets, wherein the set of predictors is mapped to a set of points in a predictor space, and wherein the set of targets is mapped to a set of points in a target space, and wherein the predictor space and the target space are independent models that each comprise a graphical representation that plots a projection of the set of predictors or the set of targets, respectively, in a three-dimensional space;

establishing, by merging a plurality of individual sub-clusters of the set of sub-clusters, a set of subgroups using a tightness factor;

selecting, based on a selection criterion, a subset of the set of subgroups; and compiling, for the subset of the set of subgroups, a set of insight data which indicates a profile of the subset of the set of subgroups with respect to the set of data.

2. The method of claim 1, further comprising:
constructing, to compress the set of data, a set of Cluster Feature (CF) trees using a sequential clustering technique to scan the set of data on a record-by-record basis.

3. The method of claim 1, further comprising:
establishing, by merging the plurality of individual sub-clusters of the set of sub-clusters, the set of subgroups using a homogeneity factor with respect to the set of predictors.

4. The method of claim 3, further comprising:
evaluating, to establish the set of subgroups using the homogeneity factor with respect to the set of predictors, the plurality of individual sub-clusters of the set of sub-clusters based on an attribute comparison with one or more other individual sub-clusters of the set of sub-clusters.

5. The method of claim 1, further comprising:
comparing a first tightness factor for a first individual sub-cluster with a tightness threshold;
comparing a second tightness factor for a second individual sub-cluster with the tightness threshold;
ascertaining achievement of the tightness threshold by both the first and second tightness factors for the first and second individual sub-clusters, wherein the plurality of individual sub-clusters includes the first and second individual sub-clusters; and
merging the plurality of individual sub-clusters of the set of sub-clusters.

6. The method of claim 1, further comprising:
configuring the selection criterion to include a subgroup size factor.

7. The method of claim 1, further comprising:
configuring the selection criterion to include a subgroup tightness factor.

8. The method of claim 1, further comprising:
configuring the selection criterion to include a subgroup isolation index.

9. The method of claim 1, further comprising:
finding, to select the subset of the set of subgroups, one or more data clusters without a reliance on decision rules that define subspaces; and
determining, based on a weightiness factor which indicates a relative threshold difference of the subset of the set of subgroups with respect to the set of data, the set of insight data.

10. The method of claim 1, further comprising:
detecting the set of sub-clusters; and
identifying a set of sub-cluster pairs of the set of sub-clusters.

11. The method of claim 10, further comprising:
analyzing the set of sub-cluster pairs of the set of sub-clusters; and
choosing, based on a proximity factor in an input space, a chosen pair of the set of sub-cluster pairs of the set of sub-clusters.

12. The method of claim 11, further comprising:
evaluating, using a target space tightness factor, a merge operation with respect to the chosen pair of the set of sub-cluster pairs of the set of sub-clusters.

13. The method of claim 11, further comprising:
evaluating, using an input space homogeneity factor, a merge operation with respect to the chosen pair of the set of sub-cluster pairs of the set of sub-clusters.

14. The method of claim 11, further comprising:
evaluating, using both a target space tightness factor and an input space homogeneity factor, a merge operation with respect to the chosen pair of the set of sub-cluster pairs of the set of sub-clusters; and
merging, based on evaluating the merge operation, the chosen pair of the set of sub-cluster pairs of the set of sub-clusters.

15. The method of claim 1, further comprising:
configuring the clustering technique to include a hierarchical-oriented clustering technique that uses the tightness factor to indicate an appropriateness of a merge operation.

16. The method of claim 15, further comprising:
determining the tightness factor based on a Euclidean distance.

17. The method of claim 1, further comprising:
executing, in a dynamic fashion to streamline data insight discovery using the clustering technique, each of:
the compressing,
the establishing,
the selecting, and
the compiling.

18. The method of claim 1, further comprising:
executing, in an automated fashion without user intervention, each of:
the compressing,
the establishing,
the selecting, and
the compiling.

19. A system for data insight discovery using a clustering technique, the system comprising:
a memory having a set of computer readable computer instructions, and
a processor for executing the set of computer readable instructions, the set of computer readable instructions including:
compressing, to assemble a set of sub-clusters, a set of data based on a set of proximity values with respect to a set of predictors and a set of targets, wherein the set of predictors is mapped to a set of points in a predictor space, and wherein the set of targets is mapped to a set of points in a target space, and wherein the predictor space and the target space are independent models that each comprise a graphical representation that plots a projection of the set of predictors or the set of targets, respectively, in a three-dimensional space;
establishing, by merging a plurality of individual sub-clusters of the set of sub-clusters, a set of subgroups using a tightness factor;
selecting, based on a selection criterion, a subset of the set of subgroups; and
compiling, for the subset of the set of subgroups, a set of insight data which indicates a profile of the subset of the set of subgroups with respect to the set of data.

20. A computer program product for data insight discovery using a clustering technique, the computer program product comprising a computer readable storage medium having program instructions embodied therewith, wherein the computer readable storage medium is not a transitory signal per se, the program instructions executable by a processor to cause the processor to perform a method comprising:
- compressing, to assemble a set of sub-clusters, a set of data based on a set of proximity values with respect to a set of predictors and a set of targets, wherein the set of predictors is mapped to a set of points in a predictor space, and wherein the set of targets is mapped to a set of points in a target space, and wherein the predictor space and the target space are independent models that each comprise a graphical representation that plots a projection of the set of predictors or the set of targets, respectively, in a three-dimensional space;
- establishing, by merging a plurality of individual sub-clusters of the set of sub-clusters, a set of subgroups using a tightness factor;
- selecting, based on a selection criterion, a subset of the set of subgroups; and
- compiling, for the subset of the set of subgroups, a set of insight data which indicates a profile of the subset of the set of subgroups with respect to the set of data.

* * * * *